United States Patent [19]
Gundlach et al.

[11] Patent Number: 5,925,400
[45] Date of Patent: Jul. 20, 1999

[54] PROCESS FOR MAKING LOW FAT BACON

[75] Inventors: Larry C. Gundlach; Ronald P. Wauters, both of Madison, Wis.; Teresa A. Raap, Glenview, Ill.; Mark E. Selz, Sun Prairie, Wis.

[73] Assignee: Kraft Foods, Inc., Northfield, Ill.

[21] Appl. No.: 08/763,913

[22] Filed: Dec. 11, 1996

[51] Int. Cl.⁶ .................................................. A23L 1/317
[52] U.S. Cl. .......................... 426/641; 426/417; 426/480; 426/513; 426/646
[58] Field of Search .................................. 426/92, 641, 646, 426/417, 480, 513, 249

[56] References Cited

U.S. PATENT DOCUMENTS

| | | |
|---|---|---|
| 3,416,931 | 12/1968 | Posegate . |
| 3,511,669 | 5/1970 | Swartz et al. . |
| 3,530,531 | 9/1970 | Posegate . |
| 3,563,764 | 2/1971 | Posegate . |
| 3,780,191 | 12/1973 | Langer et al. ............................ 426/231 |
| 3,840,677 | 10/1974 | Leidy et al. ............................... 426/94 |
| 3,890,451 | 6/1975 | Keszler .................................... 426/264 |
| 3,911,154 | 10/1975 | Weatherspoon .......................... 426/282 |
| 4,057,650 | 11/1977 | Keszler ..................................... 426/92 |
| 4,132,810 | 1/1979 | Knutson ................................... 426/104 |
| 4,166,138 | 8/1979 | Zimiski et al. ........................... 426/249 |
| 4,196,222 | 4/1980 | Cheney ..................................... 426/264 |
| 4,197,324 | 4/1980 | Ziminski et al. ......................... 426/249 |
| 4,200,959 | 5/1980 | Cheney ......................................... 17/32 |
| 4,235,935 | 11/1980 | Bone et al. ............................... 426/249 |
| 4,285,980 | 8/1981 | Lewis ....................................... 426/249 |
| 4,305,965 | 12/1981 | Cheney ..................................... 426/104 |
| 4,340,994 | 7/1982 | dos Santos et al. ......................... 17/45 |
| 4,446,159 | 5/1984 | Roth ......................................... 426/249 |
| 4,480,980 | 11/1984 | McFarland et al. .................. 425/131.1 |
| 4,539,210 | 9/1985 | O'Connell et al. ........................ 426/56 |
| 4,731,906 | 3/1988 | Matthews et al. ........................... 17/49 |
| 4,814,191 | 3/1989 | Yasuno .................................... 426/104 |
| 4,824,687 | 4/1989 | Yasuno .................................... 426/643 |
| 4,834,999 | 5/1989 | Matthews et al. ....................... 426/413 |
| 4,853,239 | 8/1989 | Suzuki et al. ............................ 426/249 |
| 5,100,680 | 3/1992 | Matthews et al. ......................... 426/92 |
| 5,132,126 | 7/1992 | Sinkler .................................... 426/241 |
| 5,145,701 | 9/1992 | Sugino .................................... 426/249 |
| 5,167,977 | 12/1992 | Gamay .................................... 426/417 |
| 5,221,554 | 6/1993 | Gamay .................................... 426/646 |
| 5,275,832 | 1/1994 | Sugino .................................... 426/249 |
| 5,382,444 | 1/1995 | Roehrig et al. .......................... 426/646 |
| 5,384,149 | 1/1995 | Lin .......................................... 426/646 |
| 5,474,790 | 12/1995 | Franklin et al. ......................... 426/646 |
| 5,688,549 | 11/1997 | Roehrig et al. .......................... 426/646 |
| 5,698,255 | 12/1997 | Roehrig et al. .......................... 426/646 |
| 5,746,649 | 5/1998 | Skarr et al. .............................. 452/172 |
| 5,762,993 | 6/1998 | Gundlach et al. ....................... 426/646 |

*Primary Examiner*—Arthur L. Corbin
*Attorney, Agent, or Firm*—Lockwood, Alex, Fitzgibbon & Cummings

[57] ABSTRACT

Bacon products having very low fat contents are provided from high fat sources which can include pork trimmings. The bacon products are made from a composite of two low-fat meat components. One of the low-fat meat components is processed from high-fat content meat trimmings which are comminuted, heated and centrifuged, preferably in conjunction with being phosphated, under specific processing conditions. The second low-fat component is desinewed to remove substantial amounts of fat associated with the sinew that is mechanically removed from whole muscle tissue. The bacon product has a total fat content of not greater than about 5 percent by weight.

22 Claims, 8 Drawing Sheets

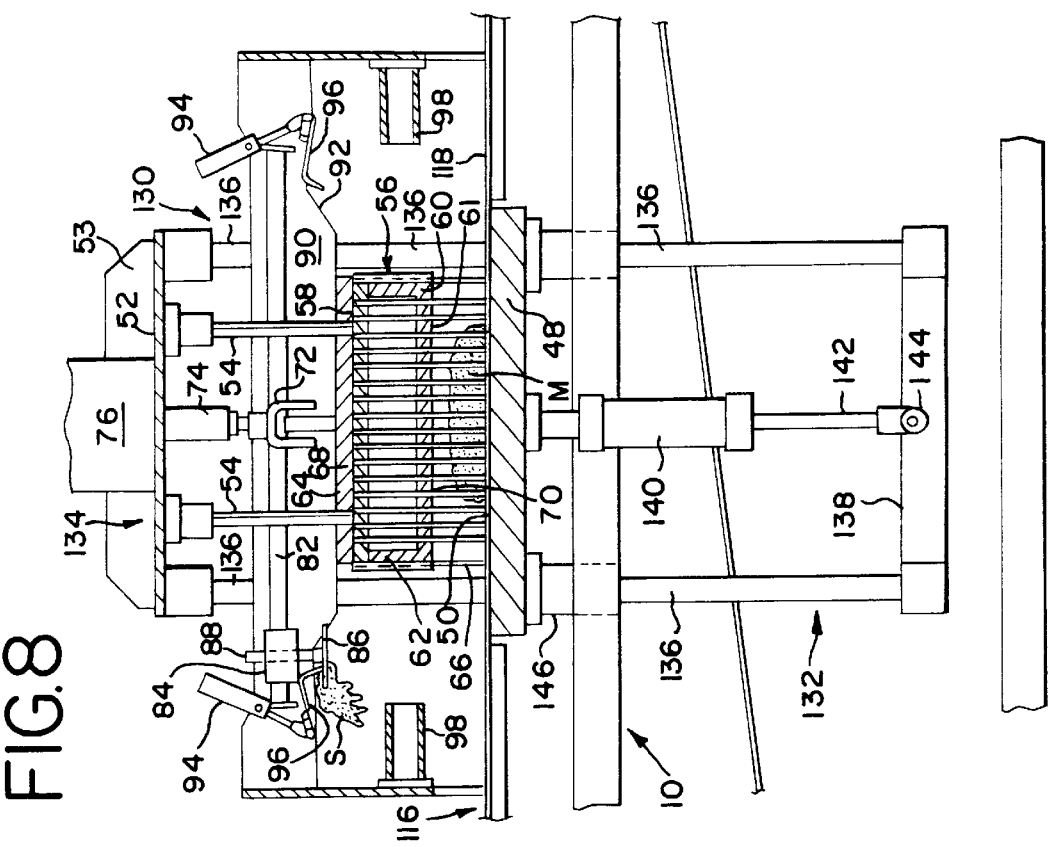
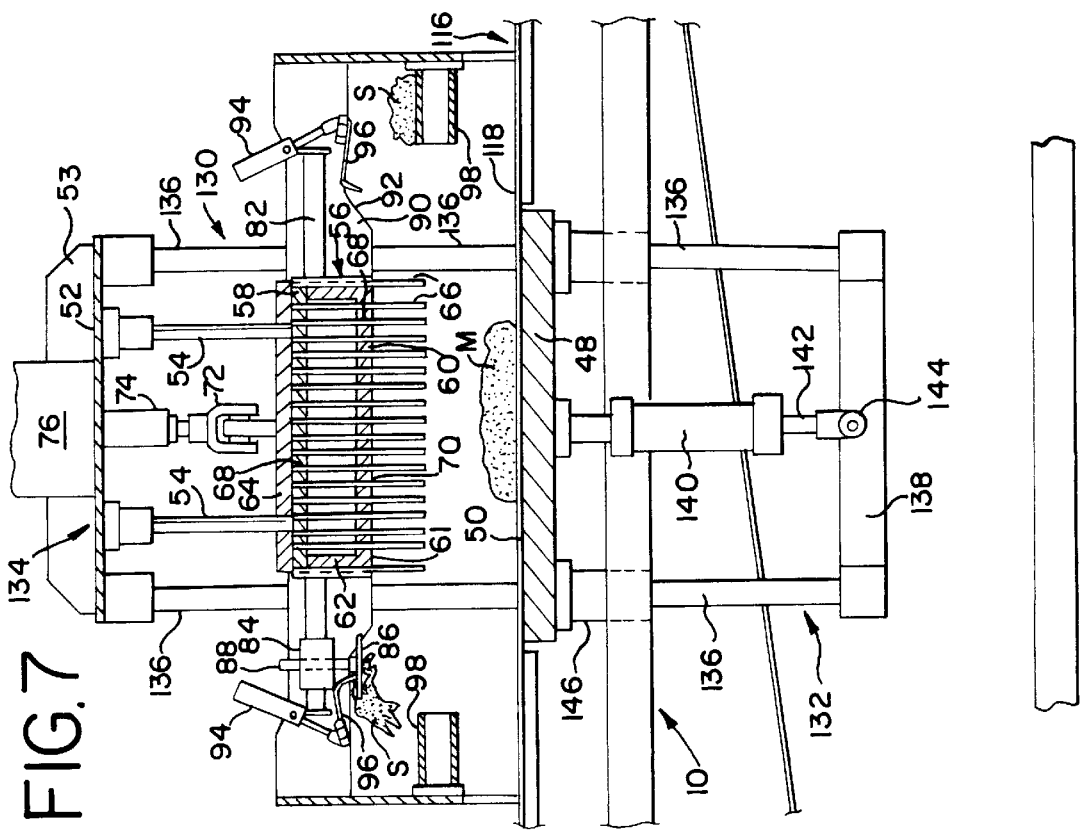

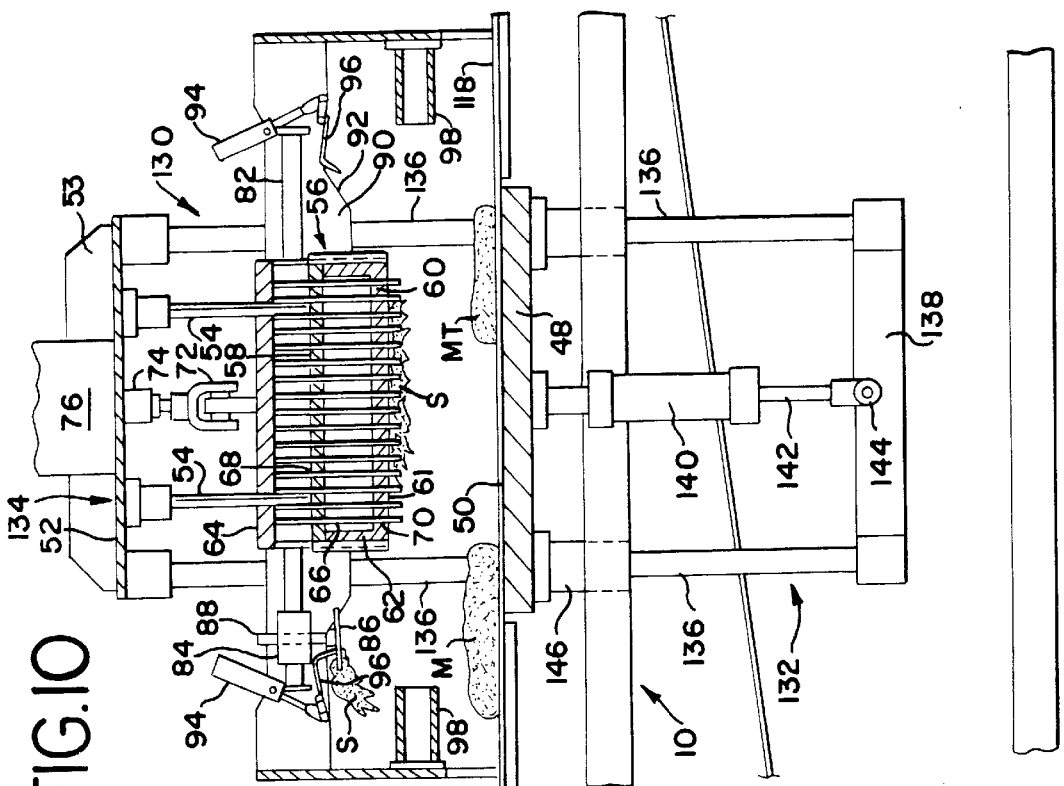
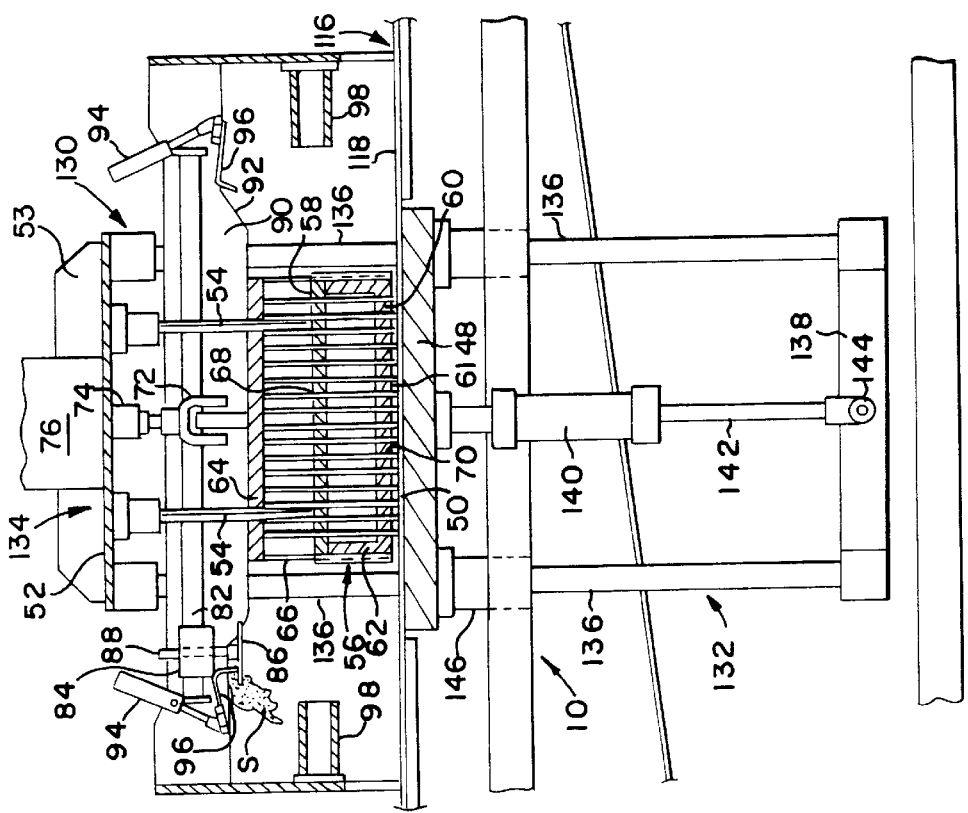

PROCESS FOR MAKING LOW FAT BACON

BACKGROUND OF THE INVENTION

The present invention generally relates to processing of raw meat into a very low-fat meat having excellent functionality, as well as to meat products of the so-called fat-free variety. More particularly, the present invention relates to bacon products which have a very low fat content, which meat products originate from meat raw materials having typical fat percentage values for natural or conventional sources of meat protein. These sources are processed into bacon products which can be made from pork or any other meat so as to provide a bacon product of extremely low fat content, including a product falling within the fat-free category. As employed herein, the term "meat" refers to beef, pork or ham, turkey, chicken or other fowl, or any other edible flesh products suitable for use as food.

The level of fat included in diets is of concern in many channels, particularly with respect to meat products or foods which contain animal-originating meat components. Meat food products are available which fall into the generally low-fat category. For example, important progress has been made in providing uncooked raw meat supplies which have what might be considered to a low-fat content, on the order of about 10 weight percent or even 5 weight percent, based upon the total weight of the raw meat supply. Traditionally, many meat products have been perceived by certain groups as being products that are relatively high in fat content. Some of these are bacon type products.

Various bacon, bacon-like or bacon-appearing products have been developed over the years. For example, it is generally known to combine sources of meat and/or vegetable and to form same into a shape of a finished product or of an intermediate product. It is also heretofore known that two or more different meat and/or vegetable compositions can be coextruded into a simulated meat block or product. In one such an approach, layers of differently appearing turkey batters are coextruded in an alternating manner in order to form a simulated bacon slab which has a fat level lower than traditional pork belly bacon but not necessarily very low fat or fat-free. Such a slab is then suitable for slicing in a generally conventional manner. Often, these slices are shingled and packaged for consumer distribution during normal trade channels for bacon products. While these types of products fill an important commercial need, other needs are not met.

It would desirable to have a bacon type of product which can be of the low-fat variety but which need not be composed of turkey. It would be particularly important from a taste and texture point of view if such a simulated bacon product could be a pork product when such is desired, but a pork product that still falls within the low-fat category. Even more desirable would be such a product which is very low in fat, preferably one which can be designated as fat-free.

More particularly, consumer perception has developed to the extent that there is a desire to have bacon-like products which are even lower in fat content than a typical low-fat level of 5% or less. Ideally, having such a product fall within the fat-free category is especially desirable. The term "fat-free" is meant to correspond to current guidelines which are followed by the USDA permit many packaged meat products to be labelled as "fat-free" provided the amount of fat in the packaged, meat product is less than 0.5 gram of fat per the nutritional "reference amount" of grams per serving of the meat product. This translates to a weight percent which can vary depending upon particular meat products. Such a product can thus be properly designated as "free" of fat, and nutritional labeling properly specifies a zero ("0") as the reported fat content.

Certain fat-free meat products which meet governmental guidelines such as discussed above have been commercialized on a production-scale basis. Typically, these are fat-free turkey and chicken whole muscle (often breast) products. Other fat-free products have been formulated from traditionally higher fat content sources. Such products can include reformulation in order to reduce fat levels by the inclusion of non-meat components to generally dilute the fat present in the meat which is included within the batter, grind or emulsion from which such a product is formed. It is often the case that these types of fat-free products, when subjected to taste tests, score significantly lower than corresponding products which are not of the fat-free variety.

Proposed approaches in the past have included processing a relatively high-fat meat supply into one that is of reduced fat content. Often, these types of procedures include cooking, grinding and/or centrifuging as a basic approach for separating a fat-rich phase from another phase having a lower fat content. The phase having a lower fat content typically contains lean fractions which unfortunately had become denatured during processing, and the functionality of this phase often is reduced substantially, rendering it unsuitable and/or undesirable for use in many applications. Also, approaches such as these often do not provide a functional, reduced fat meat having a fat percentage on the order of the low-fat or no-fat products which are the subject of the present invention.

The present invention addresses the need for reduced fat meat which has an exceptionally low-fat content so as to qualify as having a zero reported fat content, even including pork, while at the same time not being denatured to any significant extent in order to thereby provide a highly functional meat product which is exceptionally low in fat content. It is especially desirable that a fat-reduced raw meat material be provided which makes possible the preparation of bacon types of products. Substantial progress along these lines has been made by approaches such as that of U.S. Pat. No. 5,382,444, incorporated hereinto by reference. By following approaches such as this one, it has been possible to provide valuable undenatured and very low-fat meat products, but not necessarily fat-free products and/or low-fat products of pork and other meats having relatively high natural fat contents.

Fat-reduction of the types generally mentioned hereinabove reduce the meat to small sized pieces. For example, various such procedures reduce the fat content of meats to levels lower than might otherwise be readily achieved by manual or hand trimming. Typically, these include heating of the meat, grinding or comminuting of the meat to small particle sizes, centrifuging, treating with selected additives or diluents and/or adding non-fat supplements to reduce the percentage of pre-existing fat relative to the total mass without actually removing fat. These procedures have been employed singly or in some varying degrees of combination. Each has its disadvantages. Heating frequently results in some measure of denaturization. Grinding or comminution provides a quality and appearance which can be unacceptable where whole muscle tissue is expected or desired. Addition of diluents, additives or supplements alters qualities to an undesirable extent. Moreover, each of these fat removal or dilution procedures fails to remove sinew from the meat and therefore fails to address disadvantages attendant to the presence of sinew, including toughness, chewiness and/or the presence of fat cells associated with or attached to sinew.

As used herein, the term sinew refers to gristle and other connective tissues which are naturally incorporated with muscle tissue. This sinew is generally intimately interwoven with the muscle tissue. Fatty deposits are associated with and attached to the intimately interspersed sinew, which is typically not susceptible to removal by hand trimming, for example. The present invention recognizes that the removal of a significant and substantial portion of sinew without grinding the meat is an important objective, coupled with the objective of using such meat in making bacon products according to the invention.

SUMMARY OF THE INVENTION

Assembled bacon product according to the present invention incorporates desinewed whole muscle meat which is shaped and formed into a meat product or meat block. Such can be characterized as bacon product of the pork belly variety, bacon product from pork loin raw materials, so-called Canadian bacon, or the like. The product may have a two-phase appearance or give the appearance of a more homogeneous product. Whether homogeneous or multi-phased, the bacon product according to the invention incorporates multiple meat components. One or both of the meat components are prepared from meat supplies having a substantial fat content, typically in excess of 20 weight percent, based upon the total weight of the meat supply which also includes protein and moisture. This raw meat material is processed so as to provide reduced fat meat components which can meet the fat-free requirements for the particular product category. Such will have a fat content equal to or less than about 3.5% fat or 2% fat, typically less than about 1.5% fat, even for pork from which it is especially difficult to remove bound fat below the 1.5 weight percent level. Furthermore, both meat components have the functionality of a raw material meat supply.

Typically, in preparing one of these meat components, comminuted raw meat trimmings are heated to a temperature and under conditions at which fat present in the raw trimmings will liquify and its viscosity will be minimized, but protein denaturation will be substantially completely avoided. The heated comminute is passed through a suitable centrifuge, preferably in combination with a phosphate mixture, to separate most of the fat content of the meat trimmings from an enhanced fat-reduced raw meat product having enhanced functionality.

The other meat component of the bacon product can be a desinewed whole muscle meat. It is prepared by desinewing of meats by physically and mechanically removing the sinew from the meat and its muscle tissue. Removal of a significant and substantial portion of the sinew is achieved in order to substantially upgrade and improve the quality and value of the meat while removing a very large proportion of the fat when the sinew is removed. Accordingly, muscle tissue of even porcine origin, meats from which it is typically more difficult to remove or reduce the fat content, may be substantially reduced in fat to highly desirable fat levels of less than about 3 weight percent, most often less than about 2 weight percent, and in many instances to less than about 1 to 1½ weight percent fat, based upon the weight of the meat component. Generally speaking, the separating of muscle tissue from sinew includes restraining the sinew against movement relative to a surface and imparting a compressive force to the muscle tissue in a direction toward the surface while restraining the sinew. The force is sufficient to separate the muscle tissue from the sinew and cause the muscle tissue to move away from the restrained sinew in a direction at a substantial angle to the direction in which the compressive force is imparted to the muscle tissue.

It is accordingly a general object of the present invention to provide an especially reduced fat meat from meat trimmings having a much higher fat content and which are processed separately, at least one of which being meat muscle tissue from which sinew has been removed.

Another object of the present invention is to provide a very low fat extruded bacon product with a homogeneous appearance.

Another object of this invention is to provide a very low fat extruded bacon product having an appearance of light and dark streaks by co-extruding different lean materials.

Another object of the present invention is to provide a restructured bacon product which is extremely low in fat but yet is made from pork sources or other traditionally high fat sources.

Another object of the present invention is to provide a bacon product and process which provides a fat-free or "no-fat" bacon.

Another object of this invention is to provide a multi-phase bacon product having a light-colored phase from which heme pigments have been extracted and/or a dark-colored phase to which heme pigments have been added.

Another object of this invention is to provide an improved fat-reduced bacon product having superior functionality which is substantially the same as that of naturally-occurring bacon products.

Another object of the present invention is to provide fat-reduced meat products such as fat-reduced pork, beef, turkey, chicken and mutton by processing such trimmings according to procedures by which virtually all of the fat is removed from the supply of meat trimmings while avoiding any substantial detrimental effect on the functionality of the meat trimmings.

Another object of this invention is to provide reduced fat meat bacon products having a ratio of water-holding capacity to protein percentage, designated as functionality, which is equal to or greater than 3 and preferably equal to or greater than 4.

Another object of the present invention is to provide low-fat or fat-free bacon products incorporating a phase of fat-reduced meat which had been conditioned with phosphates for effecting removal of fat that would otherwise remain bound within the meat except for the inclusion of the phosphate source.

Another object of the present invention is to provide finished pork bacon products which can have taste and texture attributes closer to those of finished products prepared from traditional bacon sources such as loins and/or bellies, especially when compared with bacon-type products which do not originate from pork sources.

Another object of the present invention is to provide an improved bacon product that has a fat content which is at or below respective regulatory definitions of fat-free meat products, including those under the regulatory categories of bacon, red meat breakfast strips and poultry breakfast strips, whether ready-to-serve or ready-to-cook.

Another object of this invention is to provide an improved fat-free bacon product, including such products originating from pork cuts, which has a nominal fat content of zero.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIGS. 7, 8, 9, 10 and 11 are partially broken away, cross-sectional side elevational views of the desinewing portion of the assembly, substantially as shown in FIGS. 5 and 6, and showing the positioning and operation of several component parts of the desinewing unit during various chronological incremental steps in the illustrated desinewing method.

DESCRIPTION OF THE PREFERRED EMBODIMENTS

Certain specific information specified herein is directed to embodiments wherein the low-fat, no-fat or fat-free bacon product originates from porcine meat cuts. It will be understood and appreciated that the principles of the invention can be applied in a similar fashion to other meats and meat-like sources. The fat-containing raw materials which are transformed into the bacon products in accordance with the present invention typically are trimmings from meat processing operations. These trimmings, typically collected by cutting away visible fat from the muscle, are high in fat content. Generally speaking, these raw material meat sources or trimmings have a fat percentage on the order of about 20 to about 60 weight percent. Raw materials of this type are usually at a temperature on the order of about 40° F.

Examples of these raw material meat trimmings, which are generally available in high volumes and at relatively low costs, include 72 pork (containing roughly 28% fat and 72% "lean", which is the portion of the 72 pork is which is not fat, typically lean muscle which includes moisture). Other trimmings in this regard are 42 pork (approximately 58% and 42% lean), 50 beef (approximately 50% fat and 50% lean), mechanically deboned turkey (often between about 20% and 30% fat), and other sources of red meat, white meat, fowl or other protein sources.

Food products are entitled to be labeled as fat-free or no-fat when they meet specific criteria. Generally, a meat product is to have less than 0.5 gram of fat per reference amount and serving size. Governmental regulations set the reference amount values, which can be different from product to product. For example, current U.S. regulations are as follows. The reference amount for red meat bacon, on a cooked basis, is per 15 grams, meaning that such a fat-free product can have up to 3.33 weight percent fat. On a raw basis, the reference amount for this same category is 54 grams, allowing up to 0.94 weight percent fat. For the red meat breakfast strip category, the ready-to-cook reference amount is 30 grams, allowing up to 1.67 weight percent fat. When in a ready-to-eat form, this same category has a reference amount of 15 grams, allowing up to 3.33 weight percent fat. For poultry products, the reference amount for ready-to-cook is 26 grams, allowing for up to 1.92 weight percent fat. In the ready-to-eat version, the reference amount is 15 grams. The same is the case for ready-to-eat poultry breakfast strips, allowing up to 3.33 weight percent fat. A ready-to-cook poultry breakfast strip has a reference amount of 18 grams, allowing up to 2.78 weight percent fat. Accordingly, fat-free bacon types of products can have total maximum fat contents ranging between 0.93 weight percent and 3.33 weight percent, depending upon the particular product category within which the product is classified.

Figure 1:
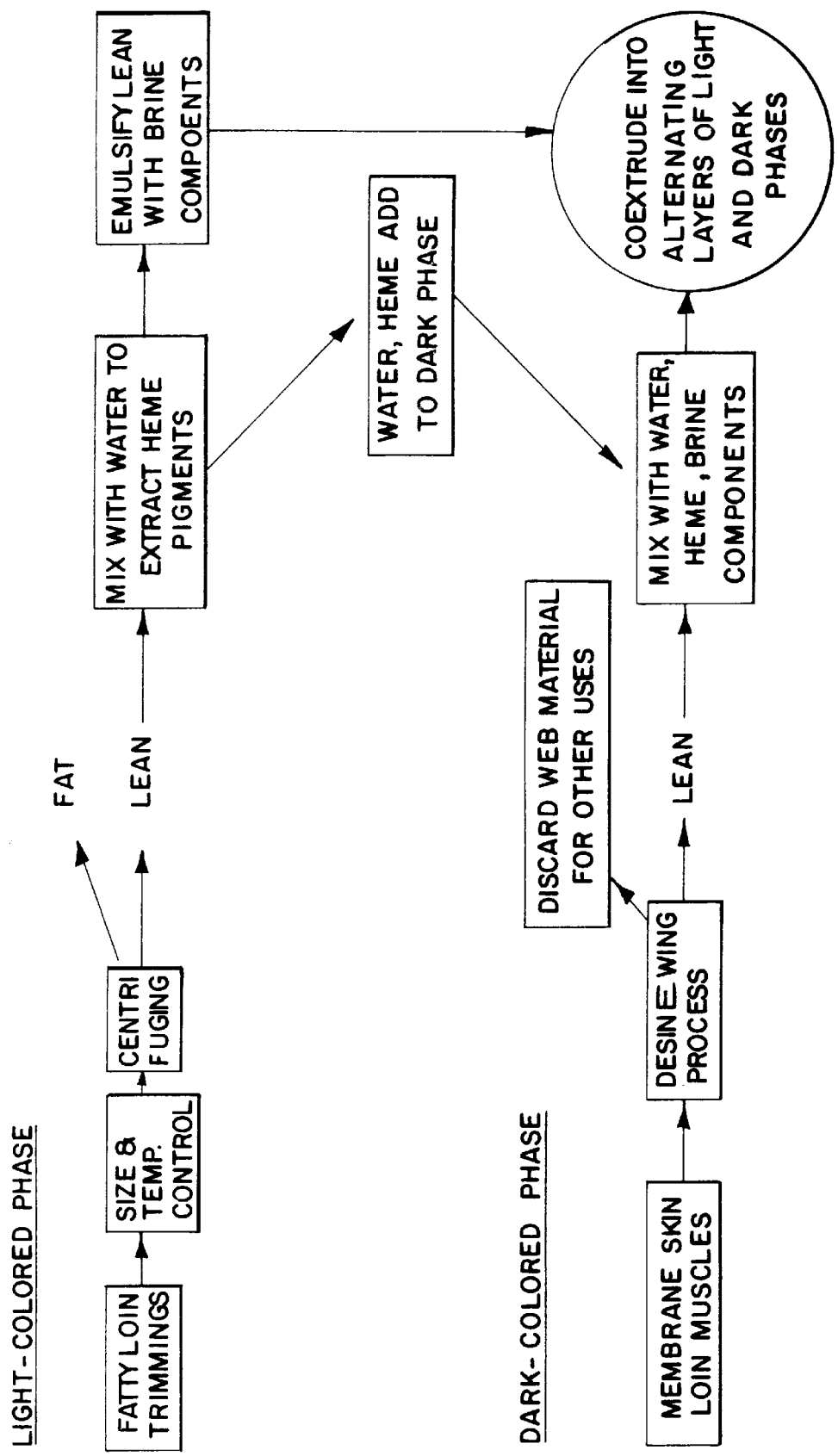
FIG. 1 is a flow chart illustrating a preferred overall procedure for making a two-phase bacon product in accordance with the present invention.
Figure 2:
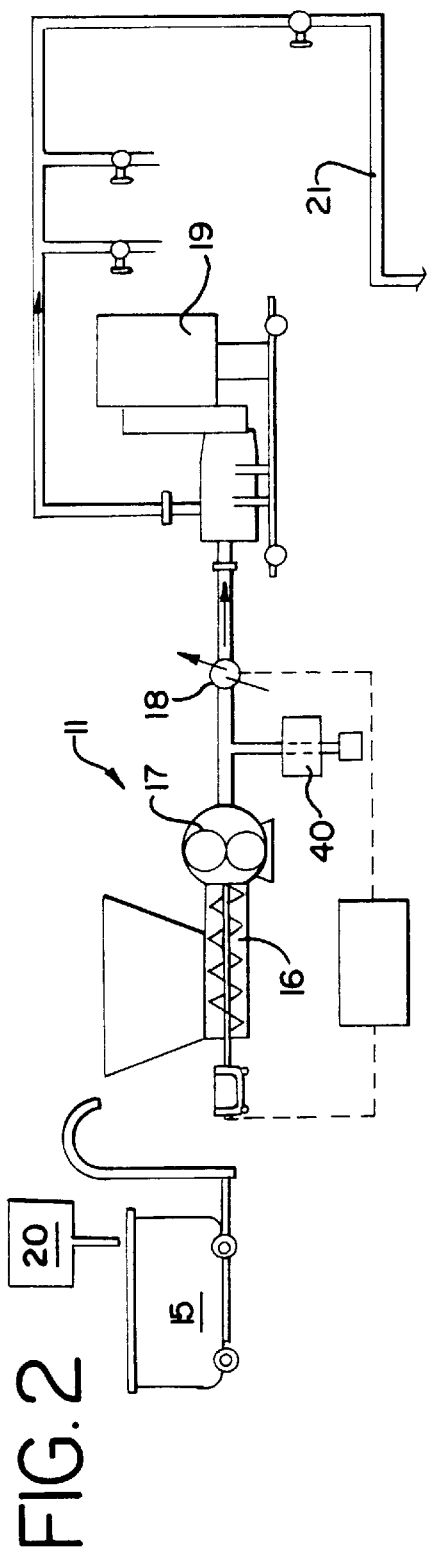
FIG. 2 is a generally schematic view of an early portion of a preferred procedure for providing one phase, which can be a light-colored phase, wherein meat trimmings which are not in a comminuted state are reduced in particle size.
Figure 3:
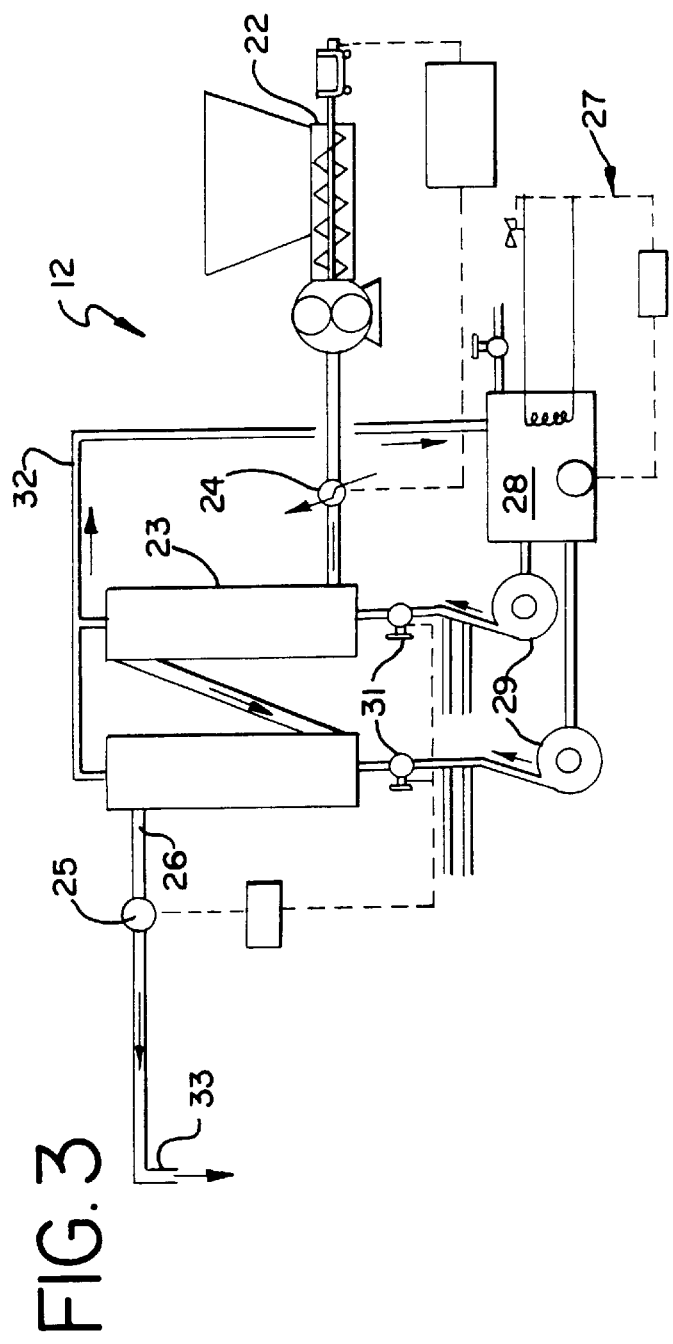
FIG. 3 is a generally schematic view of a portion of the illustrated procedure and which is subsequent to FIG. 2, wherein the temperature of the comminuted meat is continuously, rapidly and evenly modified.
Figure 4:
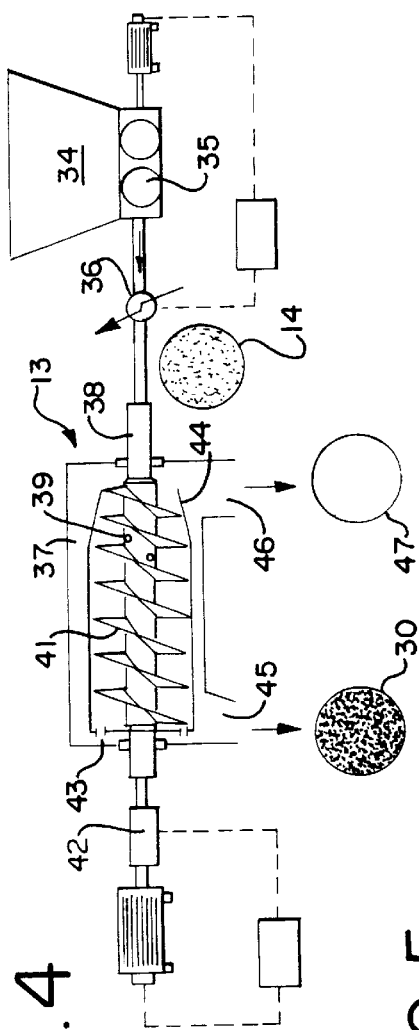
FIG. 4 is a generally schematic view illustrating passage of the warm, comminuted meat supply from FIG. 3 through a continuous decanter centrifuge in order to form this phase.

FIG. 1 illustrates a preferred procedure for forming a multi-phased bacon product according to the invention. Further details in connection with preparing one phase, typically the light-colored phase, are illustrated in FIGS. 2, 3 and 4, while further details in connection with preparing another phase, typically the dark-colored phase, are illustrated in FIGS. 5, 6, 6A, 7, 8, 9, 10, 11 and 12. The respective phases can be varied as desired from that shown in these specific illustrations. Generally speaking, the first or light-colored phase of the illustrated embodiment is prepared from fatty pork loin trimmings which are subjected to particle and temperature modification, following by centrifuging into fat and lean components. This procedure is generally in accordance with U.S. Pat. No. 5,382,444, U.S. Pat. No. 5,688,549 and U.S. Pat. No. 5,762,993, the subject matter of these being incorporated by reference hereinto. Thereafter, the highly functional lean component is combined with a second or dark-colored phase as generally discussed herein.

In the embodiment illustrated in FIG. 1, this highly functional lean ground meat material can be made to have a somewhat lighter color than the color of the meat coming off the centrifuge. When a lighter colored phase is required, the lean centrifuged product is mixed with water to extract heme pigments. More particularly, about 15 to 30 weight percent water is added to, mixed with and drained from the lean centrifuged product. This extracts water-soluble heme pigments. This pigmented extract can be combined with the second or dark-colored phase in order to further darken same and avoid the loss of useful nutrients in the final bacon product.

Whether or not the heme pigment extraction takes place, it is usually desirable to emulsify the centrifuged lean material with brine components. The emulsified lean and brine material can then be co-extruded with the dark-color phased as described herein. A traditional brine or brine-like aqueous composition is typically primarily water and includes at least about 0.5 weight percent salt. Brine compositions can contain as high as about 5%, or even 8% salt, depending upon the desired final product. Flavoring and other components, such as preservatives and components useful for improving the firmness of the completed light-colored phase of the bacon product can be included in the water composition. Exemplary components in this regard include salt, sodium nitrite, sodium ascorbate or the like, sugar and other ingredients. In an illustrated approach, the aqueous brine composition can be added to the centrifuged lean meat at a ratio of about 60 to 70 pounds of brine composition per 100 pounds of lean meat component.

The apparatus illustrated in FIGS. 2, 3 and 4 includes a particle size reduction station, generally designated as 11 in FIG. 2, a temperature adjustment station, generally designated as 12 in FIG. 3, and a centrifugation station, generally designated as 13 in FIG. 4. Although not shown in the drawings, it will be appreciated that these various stations are in communication with each other whereby meat material processed at an upstream station is passed to a receiving area of the next downstream station, as will be discussed in greater detail hereinafter.

Particle size reduction station 11 reduces the grind size of the fat-containing raw meat material to comminuted particle sizes. Generally, coarsely ground raw meat is supplied into a dumper 15 for passage into a transporting mechanism such as a pump feeder 16 of generally known construction including members such as a positive displacement pump 17 and a flow meter 18. Meat is thereby fed into a comminution unit 19 in order to reduce the particle size of the ground meat to form a flow of comminuted meat. It will be appreciated that some fat-containing raw materials such as mechanically deboned turkey are provided in a generally comminuted state, and the particle size reduction station 11 could be omitted in this instance.

A preferred comminution unit 19 is a Cozzini grinding device or emulsion mill wherein a plate having three protruding knives spins tightly against a plate having 4.5 mm holes therewithin. A rotating vane member pumps the comminuted meat through and out of the comminution unit and into a transfer conduit 21. These types of devices are high-speed grinders, and the bladed plate is pressure fit against a foraminous plate. The meat raw material is fed through a pipe into the emulsion mill housing and engages the rotating blades to be severed to a size which passes through the holes in the plate. Conduits in addition to transfer conduits 21 such as the two which are partially shown in FIG. 2 can also be provided whereby a single particle reduction station 11 can supply a flow of comminuted meat to more than one temperature adjustment station 12.

In one embodiment which includes the addition of phosphate into the system, an upstream injector 20 can be provided as shown in FIG. 2. This upstream injector deposits a phosphate source into the raw trimmings. As an example, this upstream injector 20 can open into the dumper 15 or into any other suitable container at or upstream of the pump feeder 16. Generally, this upstream location is preferred when the phosphate source is a complex one which might require some time in order to break down into a mono-type of phosphate. When the powdered buffering salt or phosphate is added in a so-called polymeric state, for example as sodium tripolyphosphate, adequate time must be available in order to release diphosphate forms for achieving the result in accordance with the invention by the time that the flow of meat enters the downstream centrifuge, as discussed in more detail hereinafter.

Another embodiment concerning the phosphate addition incorporates a dry solids injector 40 positioned upstream of the temperature adjustment station 12 and of the centrifuge assembly. Injector 40 forces the particulate or powdered buffering salt or phosphate into the meat flow. The injection is such that the phosphate enters into the continuously flowing meat stream in a manner that fosters blending into and with the meat flow. With this embodiment, it is preferred that the phosphate groups not be tied up in chemical complexes when this embodiment is practiced. In this regard, a diphosphate or the like is typically preferred when the fat removal enhancing phosphate is inserted by means of the downstream dry solids injector 40.

With more particular reference to the comminution which is typically carried out at the particle size reduction station 11, the objective is to provide a very finely ground raw meat, although the grind is not to be excessively fine. Often, one can detect meat fibers in the comminuted material. Near emulsion grinds are accomplished. The grind is to be fine enough so that many cells of fat are broken, while avoiding the breakage of so many fat cells that a true emulsion is formed at this stage and the protein material again wraps around fat particles so as to interfere with separation of protein from fat. Typically, the particle size will be less than about 2 mm, preferably less than or equal to about 1 mm. In an especially preferred situation, the meat particles or muscle fiber pieces are approximately 0.1 to 0.6 mm in length and approximately 0.06 to 0.1 mm in diameter. Other sizes are feasible as well.

Excessive comminuting can be indicated by too great of a rise in the temperature of the raw meat when it passes through the particle reduction station 11. For example, if the comminuting unit is operating under conditions such as a grinder speed which is too harsh for the flow rate through the comminuting unit, the particle size can be made too small and/or the temperature rise can be too great. It is believed that the detrimental result thereof is that the lean and fat begin to separate too early in the process, thereby making more difficult separation at subsequent stations. Also, excessive comminuting can be accompanied by some evidence of denaturing of protein.

As stated, raw fat-containing material passing through the particle size reduction station 11 will be raised in temperature as a result of the grinding operation. Typically, the temperature rise will need to be adjusted at the temperature adjustment station 12. A feeder pump apparatus 22 directs the supply of comminuted meat to a heat exchanger assembly 23.

Preferably, the heat exchanger assembly raises the temperature of the flow of comminuted meat so that the temperature of substantially the entire flow of meat therethrough is high enough to release the fat in accordance with the approach discussed herein and is typically not greater than about 115° F. (about 46° C.) or slightly thereabove. It is important that the temperature be closely controlled and that this temperature be controlled for all of the meat passing through the temperature adjustment station 12. Preferably, the temperature adjustment station 12 should maintain the desired temperature to such an extent that it is possible to maintain a target temperature ±1.5° F. (about 1° C.) for virtually all of the comminuted meat flowing through the heat exchanger assembly 23. Generally, the processing residence time within heat exchanger assembly 23 will be for less than ten minutes, preferably less than five minutes. Inclusion of one or more swept or scraped surface heat exchangers or wiped-film heat exchangers are preferred for achieving this objective.

Temperature adjustment station 12 preferably also includes a flow meter 24 and a temperature sensor 25, as well as a recirculation conduit (not shown) and an outflow conduit 26. For example, in the event that the sensor determines the temperature of the meat exiting the heat exchanger assembly 23 is not within the designated tolerances, the meat flow will be recirculated and passed again through the heat assembly 23. The heat exchanger assembly can include a water jacketing arrangement which includes a steam supply unit, generally designated as 27, a water reservoir 28, centrifugal pumps 29, flow control valves 31 and recirculation channels 32.

Heated comminuted meat flows out of an exit conduit 33 of the temperature adjustment station. At this stage, the comminuted meat temperature of all of the meat flowing through the exit conduit 33 will be lower than 120° F. (about 49° C.), preferably not greater than about 115° F. (about 46° C.). It has been found that, with most comminuted meat, if the temperature is raised to 120° F. (about 49° C.) for any significant length of time, a substantial quantity of the protein therein becomes denatured and loses its natural raw functionality. Similarly, the denaturation process typically is initiated at temperatures equal to or greater than about 115° F. (about 46° C.) if the comminuted meat is subjected to temperature much above this range for a short a time period as 5 seconds. Temperatures as low as about 90° F. (about 32° C.) or below can be adequate for some meats when longer time periods are practiced. A preferred lower limit is about 90° F. (about 32° C.), a more preferred lower limit being about 100° F. (about 37.8° C.). It will be appreciated that the exact temperature will vary with the meat source and also with the residence time. The temperature must be high enough for the particular meat source and under the particular time and flow conditions, so that optimum separation can be achieved during the subsequent steps. By closely controlling the optimum temperature for the particular meat and system, protein and fat overheating is avoided while providing the needed feed temperature into the centrifugation system 13.

Centrifugation system 13 (FIG. 4) receives the heated flow of comminuted meat. Preferably, the exit conduit 33 joins with a receiver 34 having a positive displacement pump 35 and a flow meter 36 into a continuous decanter centrifuge assembly 37. At this stage, the meat flow has an appearance of the cross-section 14, having lean components and fat components (the lighter colored portions of cross-section 14).

Referring to the operation of the decanter centrifuge assembly, same decants a fat portion 47 off of a protein or lean portion 30 by relative rotation so as to impart gravitational forces on the heated, comminuted (and preferably phosphated) meat to accomplish the enhanced decanting function. This meat flow enters tube 38 and is flung therefrom through a plurality of exit holes 39 and to an auger assembly 41. Revolutions per minute of the continuous decanter centrifuge 37 are measured by a tachometer 42, and the G-force is calculated from the revolutions per minute readings. The fat component 47 has a liquid consistency, and it exits the continuous decanter centrifuge 37 through openings 43. An angled dam 44 is provided at an opposite end of the centrifuge 37, and the auger assembly 41 augers the generally solid meat or protein component 30 toward and along the angled dam 44 and out of the centrifuge 37. The substantially liquid fat component cannot be augered up to the angled dam 44 and thus exits through the openings 43. Accordingly, the liquid fat component flows through outlet 45, while the meat or protein component flows through outlet 46. The material flowing through the outlet 45 is a fat by-product which may be further processed or discarded as desired. Flow through the outlet 46 provides the low-fat or no-fat meat product, illustrated by the cross-section 30, prepared in accordance with the invention.

Typically, the temperature of the low-fat or no-fat meat flowing from the outlet 46 will be lowered promptly for reasons well known in the art in order to avoid any risk of developing microbiologically undesirable conditions in the meat or of denaturing the meat protein. It is important to note that, with the present process and apparatus, the low-fat or no-fat meat product is not frozen, thereby avoiding a procedure which can damage meat fibers. Usually, the time during which the product is within any cooling assembly will be not greater than about 10 minutes.

In addition to being able to provide low-fat or no-fat meats having exceptionally low fat contents, the present apparatus and process provide same with a functionality that is virtually indistinguishable from that of unprocessed raw meat. The functionality is such that the reduced-fat meat is readily combined with other component(s) of the bacon product. Generally speaking, functionality is calculated by dividing the gross water holding capacity by the percentage of protein in the reduced-fat meat. It is generally believed that the present invention enhances the gross water holding capacity when meat processed according to the invention is compared with meat processed in accordance with other approaches, such as others also including meat comminution. This enhanced gross water holding capacity is believed to be an important indicator of the excellent functionality of the low-fat or no-fat meat. The present invention allows reduction of the fat percentage of high-fat trimmings, including pork, to at or below about 1.5 weight percent while maintaining the following functionality parameters: a protein level of greater than 20%, a functionality in excess of 3, and a hydroxyproline value below about 11 mg/g, preferably less than 6 mg/g.

With more particular reference to the water holding capacity, excess or gross water binding is a measure of the extra swelling capacity for meat prior to cooking and is thereby a measure of the quantity and/or quality of functional protein. This gross water holding capacity is calculated by a procedure whereby the percent cook-out is determined and is used as a measure of meat quality with respect to cooking when proteins are maximally hydrated. Regarding the hydroxyproline analysis of meat, this is an amino acid found in collagenous protein, but not in contractile protein. Thus, by quantitatively determining the hydroxyproline levels in meat products, the collagen content of the sample is measured.

With further reference to typical fat-containing starting materials, 42 pork is known as regular pork trim, and it will include about 58% fat, about 8% protein and about 34% moisture. Pork of the 72 pork trim variety typically includes about 28% fat, about 15% protein and about 57% moisture. Preferably, the low-fat or no-fat first or light-colored phase pork according to the present invention will have on the order of about 1% fat, about 23% protein and about 76% moisture. Typically, the fat percent will be not greater than 1.5% fat, preferably about 1 weight percent or less of fat, the levels going to as low as about 0.3 weight percent fat.

Addition of the phosphate salt prior to centrifugation substantially enhances the fat removal achieved during centrifugation. Generally speaking, this timely phosphate addition reduces the weight percent fat content by about 0.2 to about 0.3, at times as high as about 0.5, weight percentage points of fat-reduced content. As an example, for a reduced fat pork which, without phosphate addition, would have a fat content of about 1.5 weight percent, the phosphate addition according to the invention results in a fat content of about 1.2 weight percent or below. Thus, the fat content of the fat-reduced pork is reduced by from about 10% to about 40% by the addition of the phosphate source. Without this aspect of the invention, it is very difficult to maintain a fat level of below 1.5%, when the starting material is 72 pork.

Without being bound by any theory of a functional mechanism regarding this invention, it is believed that the phosphate addition as discussed herein reduces the viscosity of the meat, resulting in the enhanced separation of the fat component from the lean component which is accomplished when the thus-treated meat is subjected to centrifugation.

It is well known that, in the actomyosin of pork and the like, myosin and actin "slide" with respect to each other. Phosphate causes dissociation or loosening of this muscle structure so that actin protein and myosin can loosen and move around more easily in order to "release" fat components which would otherwise remain trapped in the meat structure during centrifugation carried out in the absence of this added phosphate. The phosphate is believed to provide a "softer" muscle which, when centrifuged, will "flatten out" so that the fat can separate more easily when the centrifuge takes advantage of the density differences between fat and lean.

By loosening the actin from the myosin, the fat-rich material "inside" of the muscle can be more easily removed. This loosening is facilitated by the phosphate use as described herein. In contrast, adipose tissue (fat tissue) is more easily removed because it generally sits on the "outside" of muscle bundles or strands. Thus, with pork, adipose tissue fat removal leaves about 2% to 3% fat, and phosphate addition provides for removal of further fat, such as that associated with the actomyosin structure, thereby allowing the fat percentages of 1.5 weight percent and lower as discussed herein.

Phosphate sources suitable for use include a variety of phosphate salts and polyphosphates. As discussed herein, a polyphosphate may require time to dissociate so as to free individual diphosphate moieties which are found to achieve the beneficial effect in accordance with the invention. Thus, as a general rule, the more complex the phosphate source, the more likely same will have to be added at an upstream injection location, rather than at a more downstream injection location into the meat flow. Generally speaking, the phosphate source can be added at between about 0.1 to about 0.5 weight percent phosphate, based upon the meat being treated. A preferred range is between about 0.2% and about 0.5% phosphate. Generally speaking, higher levels do not further enhance fat removal and typically will be avoided. There is no desire to attempt to reach the isoelectric point of the meat, which is generally detrimental to functionality.

Examples of phosphate sources include sodium pyrophosphate (a diphosphate), potassium pyrophosphate, sodium tripolyphosphate and potassium tripolyphosphate. Also available and useful are blends of sodium or potassium acid pyrophosphate, tetrasodium pyrophosphate, tetrapotassium pyrophosphate, potassium hexametaphosphate, sodium hexametaphosphate or other such polyphosphates. They can be in particulate form, which is preferred, or in liquid form, such as when the phosphate is within an aqueous carrier.

Figure 5:
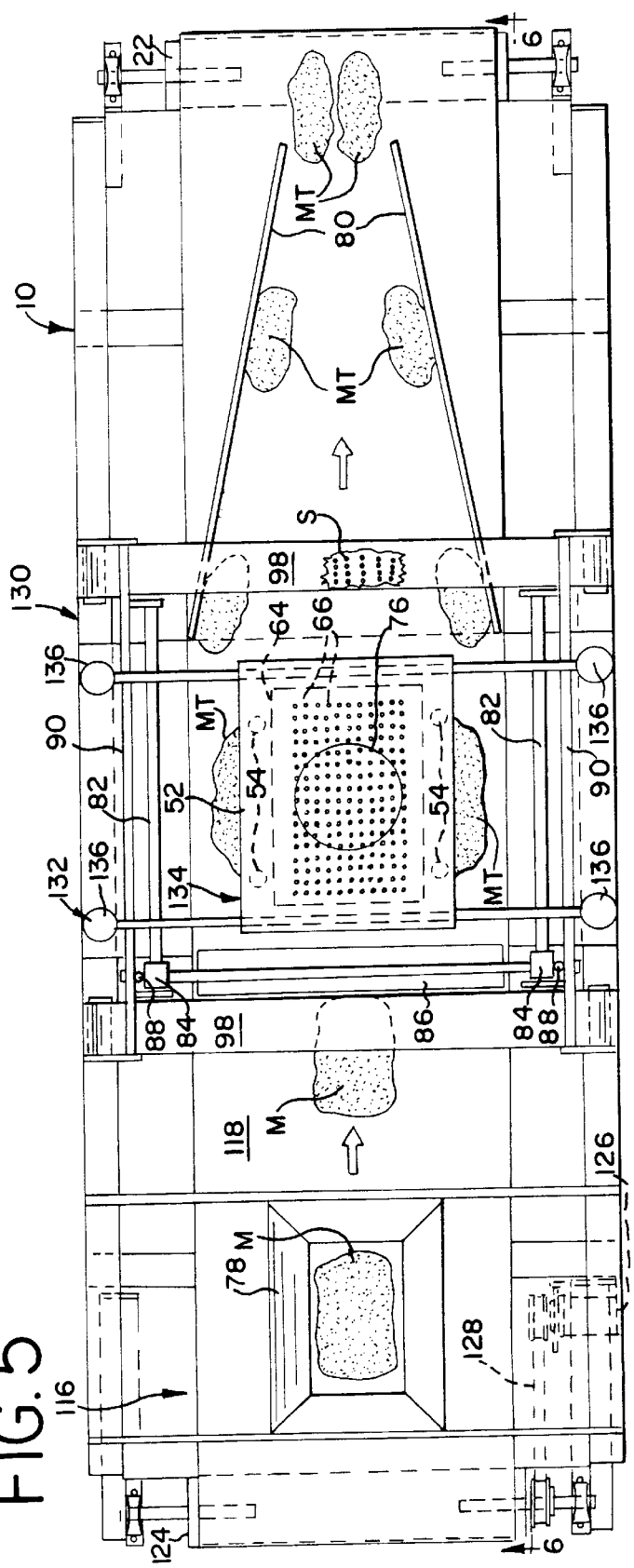
FIG. 5 is an illustration of a preferred apparatus and procedure for providing the other phase, such as a dark-colored phase, used in making the bacon product according to the invention, such being a plan view of an assembly for desinewing and for practicing the method of separation of sinew from muscle tissue.
Figure 6:
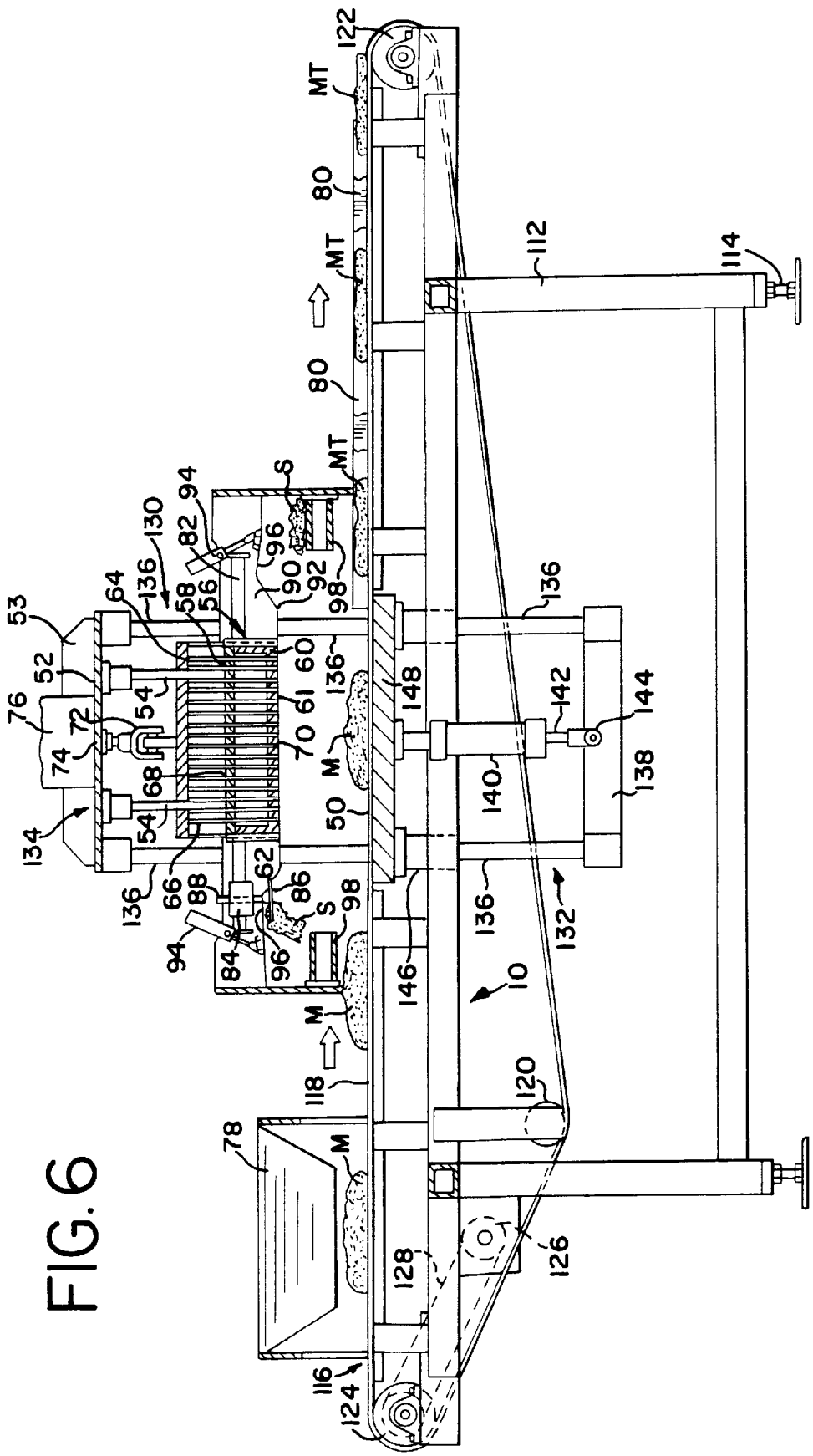
FIG. 6 is a partially broken away, cross-sectional side elevational view of the assembly substantially as shown in FIG. 5 and viewed substantially along the line 6—6 of FIG. 5.

One preferred embodiment for providing the second or dark-colored phase according to the invention is shown in FIGS. 5 and 6. Details of the operation of that preferred desinewing embodiment of the assembly and method of this aspect of the invention are shown sequentially in FIGS. 7 through 11. This is generally in accordance with U.S. Pat. No. 5,746,649 its subject matter being incorporated by reference hereinto.

Referring to FIGS. 5 and 6, the assembly includes a frame 10 supported upon a plurality of legs 112. One or more of the legs 112 preferably include leveling feet 114 at the bottom to permit leveling of the assembly and to make certain that the assembly is firmly and stationarily supported upon the floor or other surface upon which it is to operate. It will be appreciated that firm rigid support of the assembly is desirable upon considering the operation of the assembly and the substantial forces and movements which occur in various of its components during its operation.

A conveyor 116 is positioned at the top of the frame 10. The conveyor 116 preferably comprises an endless conveyor belt 118, which is preferably formed of a hard, flexible strong polymer which is food compatible and which is capable of withstanding the substantial forces and wear to which it will be exposed. Such polymers may include polyethylene and the like. The conveyor belt 118 is trained around one or more idler rollers 120 and 122 as best seen in FIG. 6 and also around a powered drive roller 124. The drive roller 124 may be driven by a suitable motor 126 via either a pulley and belt drive or chain and sprocket drive 128. It will be appreciated that the location of the idler roller 122 and drive roller 124 may be reversed from that shown in the drawing without departing from the principles of the invention.

The principal feature of the illustrated desinewing assembly is the desinewing unit 130 of the assembly. In general the desinewing unit 130 comprises two movable, force imparting subassemblies, a lift assembly generally 132 and a head assembly generally 134.

The lift assembly 132 preferably comprises at least four spaced, vertical lift posts 136 which extend through, above and beneath the plane of the upper surface of the conveyor belt 118, as best seen in FIGS. 6–11, and which straddle the conveyor belt, as best seen in FIG. 5. A strong, rigid frame 138 is fixed at its corners to the bottom of each of the lift posts 136. A suitable drive means, such as a reciprocating hydraulic cylinder 140, is stationarily fixed at one end to the frame 10, and its piston rod 142 which extends from the other end of the cylinder 140 is coupled by a suitable coupling 144 to the frame 138. Preferably this piston rod coupling 144 permits some degree of pivotal or rotational motion to compensate for variations in alignment between the piston rod 142, the frame 138 and the spaced posts 136 during their movement and operation.

In the embodiment shown, the lift posts 136 are reciprocated up and down by the hydraulic cylinder 140 and frame 138. As the lift posts 136 reciprocate through the plane of the upper flight of the conveyor belt 118, they are preferably guided by journals 146 which are mounted to a substantially flat, heavy gauge rigid base plate 48. The base plate 48 is of heavy and substantial construction so that it is capable of readily withstanding the forces to be applied to it during the desinewing operation, as will be later described. The base plate 48 presents an upper surface 50 upon which the conveyor belt 118 slides and is supported during the desinewing operation. Also in the embodiment shown, the upper end of the hydraulic cylinder 140 is shown as mounted to the underside of the base plate 48.

The upper ends of the lift posts 136 are fixed at the corners of a relatively heavy gauge plate 52 upon which the head assembly 134 is mounted. The plate 52 may be further stiffened with elongate stiffeners 53. It will be seen that the plate 52 together with the head assembly 134 will move up and down by virtue of the operation of the lift assembly 132.

A plurality of spaced, vertical head posts 54 are stationarily mounted at their tops to plate 52. The head posts 54 extend vertically downward from the plate 52 and their bottoms are fixed to a compression assembly, generally 56.

The compression assembly 56 comprises a pair of spaced plates, an upper spacing plate 58 and a lower compression plate 60. The spacing plate 58 and compression plate 60 are spaced from each other by any suitable means, such as a wall 62 as shown in the drawings, and the spacing of the plates 58 and 60 relative to each other is preferably fixed and remains unchanged during operation. The bottom ends of the head posts 54 are fixedly attached to spacing plate 58 so that the spacing plate and hence the compression assembly 56 will move up and down in conjunction with the vertical movement of the head posts 54, the plate 52, the lift posts 36 and the lift assembly 132 generally.

Figure 6A:
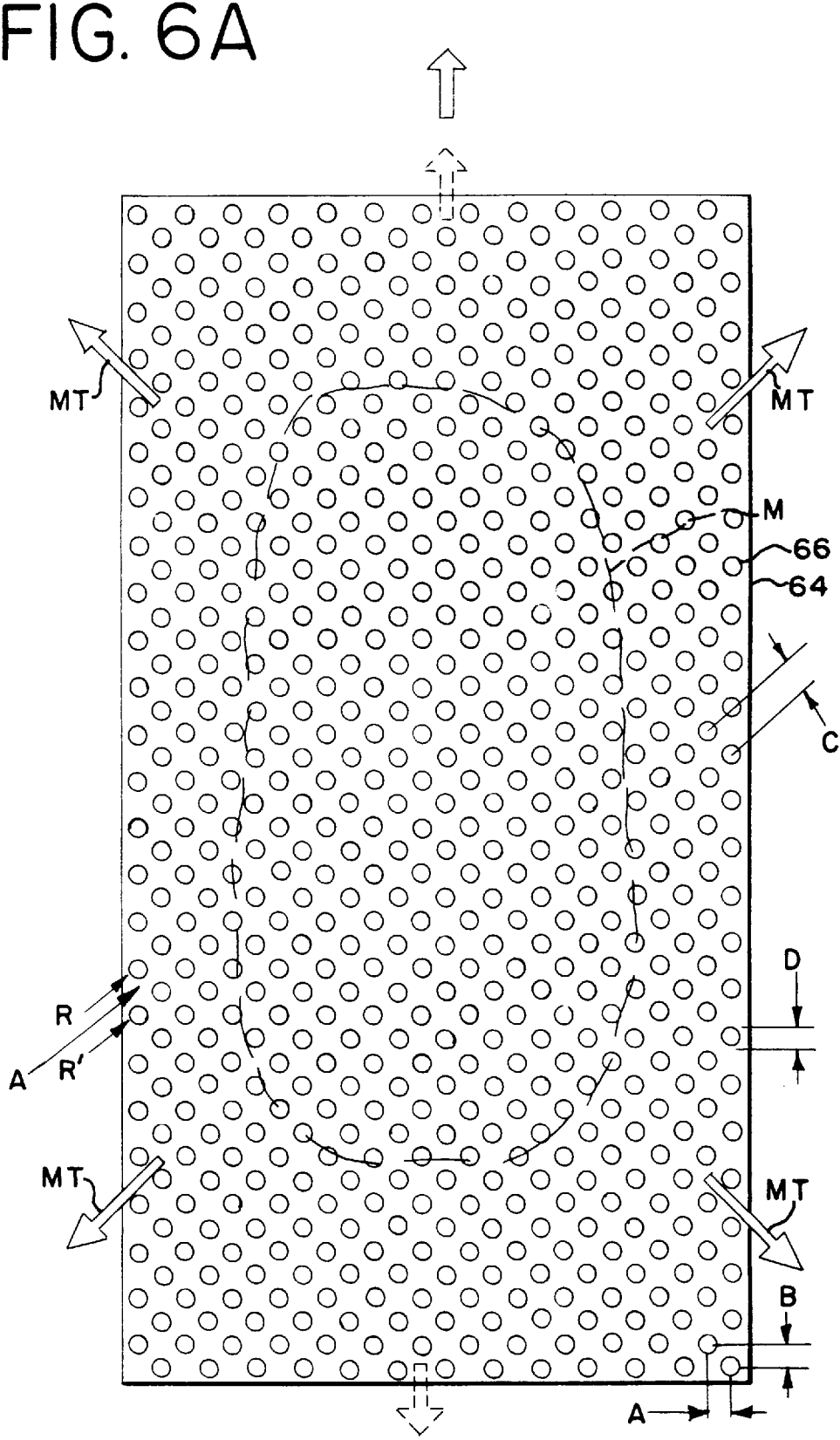
FIG. 6A is a schematic plan view of the pin plate of the assembly shown in FIGS. 5 and 6 and showing a preferred embodiment of pin arrangement and flow direction of desinewed muscle tissue which has been separated from sinew.

The head assembly 134 also includes a pin plate 64 above the compression assembly 56. A plurality of elongate pins 66 are fixed at their tops to the pin plate 64 and so as to extend vertically downwardly through apertures 68 in the spacing plate 58, and also through apertures 70 in the compression plate 60. The pins 66 are preferably arranged in columns and/or rows and the pins 66 of each column and/or row are preferably staggered from each other as shown in FIG. 6A to also form diagonal rows as shown. This will be discussed in more detail below. Accordingly, the pins 66 will be spaced from each other in the directions a, b and c as generally shown in FIG. 6A. It will be seen from FIGS. 6–11, that the pins 66 also preferably have blunt ends and are slidably movable through the apertures 68 and 70 and through the plates 58 and 60 as the pin plate 64 and press assembly 56 are moved relative to each other. The pin plate 64 is mounted for operation by a suitable coupling 72, preferably capable of at least some degree of pivotal motion, to the piston rod 74 of a power cylinder 76. The power cylinder 76 is preferably a pneumatic cylinder to preclude the possibility of undesirable leakage of hydraulic fluid which might result in contamination of the food products being processed. The air cylinder 76, in turn, is mounted on the plate 52 for up and down movement therewith by the lift assembly 132.

The assembly embodiment shown in FIGS. 5 and 6 also preferably includes some form of positioning and delivery equipment for delivering the meat M which is to be desinewed to the input end of the conveyor 116 and to position it so that it is properly aligned with the desinewing unit 130. This may comprise for example a hopper 78, as shown in FIGS. 5 and 6, into which the meat M to be processed may be deposited so as to fall upon the conveyor 118 as shown in FIG. 6, in a proper position to be received by the desinewing unit 130 upon indexing of the conveyor belt 118. When the meat M is processed according to the invention to separate its desirable muscle tissue MT from the sinew, the muscle tissue MT continues to be indexed along the assembly, also as shown by the hollow arrows in FIGS. 5 and 6, for discharge and further formulation into the final consumer product. Guidance of this muscle tissue MT may be facilitated by way of siderails 80. This muscle tissue MT is the preferred second lean phase or dark-colored phase component of the bacon product.

Prior to discussing any further details of any of the remaining components of the desinewing assembly embodiment shown in FIGS. 5 and 6, a description of the operation of the assembly and method as shown in FIGS. 5–11 and as thus far described to separate the muscle tissue and sinew from the meat M will follow next to facilitate a clearer understanding of this aspect of the invention.

The meat from which the sinew and/or fat which is associated with and attached to the sinew is to be removed is first deboned and cut into manageable sized pieces. These pieces are preferably further hand trimmed to remove any large visually distinct and accessible collections of fat, gristle and the like. These pieces are also preferably cleaned of any connective tissue membrane which might be present because the membrane, like the sinew, harbors generally undesirable fat cells associated with it. The connective tissue membrane may be removed using conventional membrane skinning equipment, such as a Maja or Townsend membrane skinner.

These boneless trimmed pieces or cuts of whole muscle meat M which are now to be processed are introduced to the input end of the conveyor belt 118 and properly positioned thereon by deposit through the hopper 78. The hopper 78 is preferably stationarily mounted relative to the input end of the conveyor belt 118 so that the meat M which is to be processed is properly positioned relative to the desinewing unit 130 as each piece is introduced to the assembly and method of the invention.

The conveyor belt 118 is then indexed by a suitable control (not shown) as well known to those skilled in the art to progressively move the meat M which has been deposited on the conveyor belt 118 and from which the sinew is to be removed in the direction of the hollow arrows shown in FIGS. 5, 6 and 6A and from beneath the hopper 78 in progressive indexed steps until it is beneath the desinewing unit 130. The location and size of the hopper 78 are selected relative to the length of each indexing step so that once the meat M from which the sinew is to be removed reaches the desinewing unit 130, it is properly positioned both longitudinally and transversely directly beneath the press assembly 56 and pin plate 64 and its pins 66, as shown in FIG. 6.

At this time the cylinder 76 of the head assembly 134 is actuated so that its piston rod 74 will extend and move the pin plate 64 from the position shown in FIG. 6 to the position shown in FIG. 7. As shown in FIG. 7, the pin plate 64 will move downwardly along head posts 54 until it rests upon the upper side of the spacing plate 58 of the compression assembly 56. As the pin plate 64 moves downwardly, its pins 66 will move from their retracted position as viewed in FIG. 6 to the position, as viewed in FIG. 7, in which their bottom ends extend from the surface 61 of the compression plate 60.

The force applied to the pin plate 64 by the air cylinder 76 should at least be of sufficient magnitude to be adequate for the pins 66 to stationarily restrain the sinew during desinewing as will be described below. By way of example it has been found that a force of about 3000–4000 pounds is adequate for this purpose where the pin plate has about 650 pins 66 which are about ¼ inch in diameter, i.e. about 32 in$^2$ of pins. If the number of pins and/or diameter is reduced, the force may be reduced, and conversely, if the number of pins and/or their diameter is increased the force should be generally increased in order to be of sufficient magnitude to insure that the sinew is stationarily restrained during the desinewing operation. The maximum amount of force is not critical and can be of any magnitude so long as it is sufficient to restrain the sinew against movement relative to the top surface of the belt 118 which is supported on the surface 50 of the base plate 48 and the compression surface 61 of the compression plate 60 as will be discussed below. Excessive forces are not preferred, however, because they are wasteful of energy and require heavier duty parts without achieving any appreciable further desirable result.

After the pin plate 64 has moved downwardly into contact with the upper surface of the spacing plate 58 as shown in FIG. 7, the air pressure is continued to be maintained in the cylinder 76 at least during the next two subsequent steps.

With particular reference now to FIG. 8, the lift assembly 132 is now actuated by supplying fluid pressure to the cylinder 140. This will cause the piston rod 142 of cylinder 140 to extend to move the frame 138 downward. As the frame 138 moves downwardly, it will move the lift posts 136 downwardly together with the plate 52 at the top of the lift posts. Movement of the plate 52 downwardly will also cause the head assembly 134 to also move downwardly with the cylinder 76 which is mounted to the plate 52 and the head posts 54 which also are firmly mounted to the plate 52. As the head posts 54 move downwardly, the compression assembly 56, the pin plate 64 which already rests on the compression assembly, and the pins 66 will also move downwardly until the blunt ends of the pins pierce or skewer the meat M and come to rest forcefully bearing against the top side of the conveyor belt 118 which in turn is supported by the upper surface 50 of the base plate 48, all as shown in FIG. 8.

With particular reference now to FIG. 9, the lift assembly 132 will continue to move downwardly. However, at this point the pins 66 have come to rest against the top surface of the conveyor belt 118 and, therefore, the pin plate 64 and the pins 66 will be restrained from further downward movement and will stop. The compression assembly 56, however, will continue to move downwardly and away from the pin plate 64 because the downward force exerted by the cylinder 140 is substantially greater than the force exerted by the cylinder 76 on the pin plate 64 and pins 66 as previously discussed. By way of example, it has been found that a force of about 5000–10000 pounds where the compression surface 61 is about 10 by 15 inches, i.e. about 150 in$^2$, is adequate to compress the muscle tissue sufficiently to remove it from and move it away and at a sharp angle from the sinew S which is restrained against movement relative to the conveyor 118, the surface 50 of the base plate 48 and the compression surface 61 as in the present invention. Again this force may be reduced somewhat if the compression surface 61 is reduced in size, and increased if the surface 61 is increased in size. And again, the maximum force is not critical, except that excessive forces which produce no additional benefit are not preferred as being wasteful and necessitating excessively heavy duty parts.

The compression assembly 56 will continue to move downwardly until it assumes its most downward position shown in FIG. 9. In this position the compression surface 61 of the compression plate 60 will exert a substantial compression force upon the meat as previously mentioned and which is sufficient to separate the muscle tissue from the sinew and force the tissue away from the restrained sinew, while a somewhat lesser force continues to be independently exerted on the pins 66 by the cylinder 76, but which lesser force is sufficient to restrain the sinew in the meat from sidewise movement and against movement relative to the conveyor 118, the surface 50 of the base plate 48 and the compression surface 61. The muscle tissue in the meat M which is separated from the sinew will exude outwardly toward the sides of the pin plate 66 through the spaces between the pins 66, as shown by the solid arrows in FIG. 6A, and transversely from beneath the compression assembly 56 and its compression plate 60 as best seen in FIG. 5.

Once the muscle tissue, which is suitable for the dark colored phase, MT has been separated from the sinew which has been stationarily restrained by the pins 66, and has been exuded from beneath the compression plate 60, the assembly is indexed to its next cycle. As shown in FIGS. 5 and 10, when this indexing is initiated, cylinders 140 and 76 are reversed. Reversal of cylinder 140 will result in the raising of the lift assembly 32 as shown in FIG. 10, and the piston rod 142, frame 138, lift posts 136 and plate 52. Because the cylinder 76, head posts 54 and press assembly 56 are also mounted to the plate 52, they will also rise away from the conveyor belt 118 together with pin plate 64 and pins 66. As the compression surface 61 rises, the web of sinew S which was previously restrained and which has now been separated from the meat will firmly adhere to the surface 61 and will rise with that surface as shown in FIG. 10. The movement of the pin plate 64 relative to the compression assembly 56 and away from the conveyor belt 118 is preferably somewhat delayed while the compression assembly is being raised to cause the ends of the pins 61 to at least initially project somewhat beneath the surface 61 during this rising withdrawal. This will sufficiently reduce any tenacious adhesion of the web of sinew S to the rising surface 61 so that it may later be more easily removed as will be described to follow.

Figure 11:
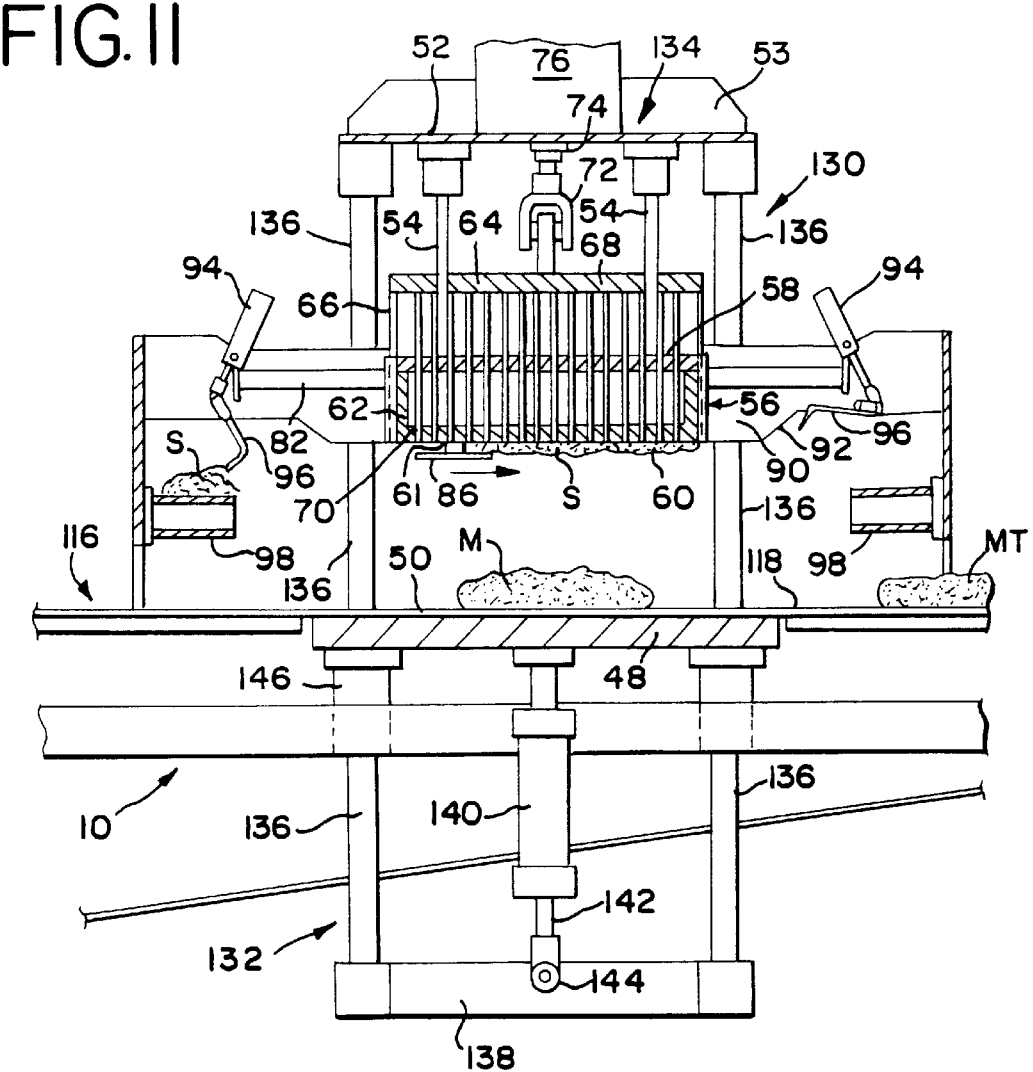

Once the desinewing unit 130 has been fully raised and withdrawn to the position shown in FIG. 11, the pin plate 64 will also be fully raised so that the blunt ends of the pins 66 will have moved into the compression plate 60 at least to the extent that they are flush with the surface 61. This will permit the web of sinew S to be easily scraped from the surface 61 as will be further described below.

Either while the desinewing unit 130 is in the process of retraction and raising as viewed in FIG. 10 or once it has become fully raised and retracted as viewed in FIG. 11, the conveyor belt 118 is indexed to move the just separated whole muscle tissue MT forward and toward the right end of the conveyor as viewed in FIGS. 5, 10 and 11, and to initiate movement of a new batch of meat M to be desinewed to a position beneath the press assembly 56, as progressively shown in FIGS. 10 and 11.

One embodiment of subassembly is shown for the removal of the sinew S which has been removed from the muscle tissue, and which has adhered to the surface 61 after that surface has been raised and withdrawn to the position shown in FIG. 11. In this sinew web removal subassembly embodiment, a pair of rodless cylinders 82 are mounted to extend horizontally and longitudinally of the conveyor belt 118 and within the lift posts 136, but straddling the press assembly 56. Each of the rodless cylinders 82 includes a movable carriage 84 which is movable axially along the length of the cylinder. The carriage 84 of each cylinder is magnetically coupled to the piston (not shown) within each of the rodless cylinders 82. A scraper 86 extends between and slightly beyond the carriages 84 and transversely across the conveyor belt. The scraper 86 is mounted to the respective carriages 84 by a spring loaded rod 88 which normally urges the scraper 86 upwardly as viewed in the drawings.

A pair of elongate, spaced parallel camming plates 90, each having a downwardly facing cam surface 92, also extend in a direction generally parallel to the rodless cylinders 82 and the direction of movement of the conveyor belt 118. These camming plates 90 also straddle the press assembly 56 and pin plate 64, as best seen in FIG. 5, but are positioned just outside of the rodless cylinders 82 and the cylinders 82 are mounted to them. During each cycle of operation of the desinewing unit 130, the scraper 86 is positioned out of action in a retracted position at one of the elevated ends of the cam surface 92, for example as shown in FIG. 9, until desinewing has been completed. When desinewing has been completed and the compression assembly 56, pin plate 64 and pins 66 have been raised and withdrawn and the blunt ends of the pins have been withdrawn to at least be flush with the surface 61 of the compression plate 60, all as shown in FIG. 11, the scraper 86 will be moved longitudinally from one end of the desinewing unit 130 to the other end, as shown by the arrow, along the cam surfaces 92 and beneath the surface 61 to scrape the web of sinew S which is stuck to the surface 61 from the surface and carry it to the other end of the cam surfaces 92 to be discarded.

The sinew web removal subassembly embodiment as shown also includes a small, preferably pneumatically operated cylinder 94 adjacent each end of the rodless cylinder 82. Cylinder 94 operates a pivotally mounted sinew web removal scraping finger 96 for scraping and discharging a sinew web S from the scraper 86 which had been removed from the surface 61 of the press plate 60 in the last preceding processing cycle. The sinew web S which is removed from the scraper 86 is deposited by the fingers 96, as shown in FIG. 11, on web removal conveyors 98 which extend laterally above the conveyor belt for removal of the sinew webs S from the assembly.

The sinew web removal and assembly, as thus far described, operates essentially as follows. As previously described, substantial compression forces were applied to the meat M from which the sinew is to be removed between the top surface of the conveyor belt as supported by the plate 48, and the compression surface 61 of the compression plate 60 while the sinew was restrained with the pins 66 in order to separate the muscle tissue from the restrained sinew. Once the muscle tissue MT has been separated, the lift assembly 132 will retract the press assembly 56, the pin plate 64 and the pins 66 by moving them upwardly as viewed in FIG. 10. During this retraction and upward movement, the blunt ends of the pins 66 are preferably permitted to continue to project somewhat beyond the compression surface 61 as shown in FIG. 10. As previously mentioned, this assists in the loosening of the web of sinew S which otherwise firmly and tenaciously adheres to the surface 61 of compression plate 60.

Once the compression assembly 56, pin plate 64 and pins 66 have been fully retracted, they will assume the position as viewed in FIG. 11. In this position the pins 66 will now at least be withdrawn to the point that their blunt ends are flush with the surface 61. This will permit the scraper 86 to travel the length of the surface 61 to scrape and remove the web of sinew S which is adhering to it.

Referring to FIGS. 10 and 11, in order to commence the removal of the sinew web S, the rodless cylinders 82 are actuated to move the carriages 84 from their left at rest position as viewed in FIG. 6 to the right. This will cause the scraper 86, which is upwardly spring loaded by the pin 88, to move downwardly from the position shown in FIG. 10 as the scraper moves to the right along the cam surface 92. The scraper 86 therefore will pass beneath the surface 61 of the press plate 60 to scrape and remove the web of sinew S as shown in FIG. 11. At the same time that the scraper 86 commences movement from its position as shown in FIG. 10, the cylinder 94 at that position will also be activated. When the cylinder 94 is actuated, it will rotate the scraping finger 96, as shown in FIG. 11, to scrape the web of sinew S which was on the scraper 86 from its previous scraping run, and flip it onto the conveyor 98 for removal laterally of the assembly as viewed in FIG. 5.

As the scraper 86 traverses the length of the surface 61, it will scrape and remove the web of sinew S from that surface and carry it to the right in the direction of the arrow as shown in FIG. 11 until the scraper 86 reaches the other end of its run. At that point, the carriages 84 and scraper 86 will stop with the just removed web of sinew hanging from the scraper. Thus, the scraper 86 with the just removed web of sinew is now positioned on the right in readiness for the web of sinew to be removed by the right hand scraping finger 96 during the next subsequent indexed processing step.

Although the sinew web removal subassembly has been depicted as being relatively stationarily mounted relative to the up and down movement of the components of the desinewing unit, it will be appreciated that some or all of the components of the sinew web removal subassembly may be mounted for movement in conjunction with parts of the head assembly 134. For example, the rodless cylinders 82, scraper 86 and camming plates 90 may be mounted to and move up and down with either the press assembly 56 or the pin plate 64.

Figure 12:
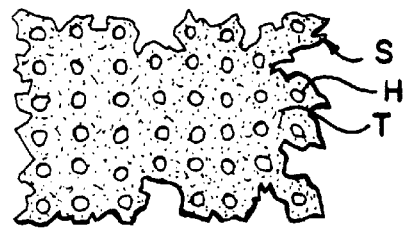
FIG. 12 is a plan view sketch of a typical web of sinew following separation and removal from the muscle tissue of the meat making up the phase prepared according to FIG. 5 through FIG. 11.

Referring to FIG. 12 a typical web of sinew S is depicted as just removed from the whole muscle tissue by the present invention. The sinew web S which adheres to the surface 61 as it is raised and scraped, as shown in FIGS. 10 and 11, is a wet and sticky stringy sheet which resembles to some extent a laced or crocheted appearance of interwoven or interlaced connective tissue T with holes H interspersed in the laced sheet. It will typically have a rather mottled white to pink to red coloration depending upon the amount of muscle tissue which has been separated from the sinew and the amount which remains with the sinew. The sinew web S will also typically contain a considerable number of fat cells which continue to adhere to the sinew upon separation of the muscle tissue from the sinew. The muscle tissue MT for use in the bacon product of the invention is still whole muscle tissue which has not been ground or comminuted.

As shown in FIG. 6A, the pins 66 preferably are arranged in a staggered relationship to each other to not only form rows and/or columns of pins at right angles to each other, but also form diagonal rows of pins R and R' with diagonally extending aisles A between the rows R and R'. The diagonal aisles A are defined by the spaces between respective pins in adjacent rows R and R', and because the aisles A are straight and uninterrupted, they will conduct the muscle tissue MT from the meat M toward the sides as shown by the solid arrows in FIG. 6A. From there the desirable muscle tissue MT can be conveyed away as previously described for use in making the bacon product(s). With the diagonal arrangement as seen in FIG. 6A, the amount of desirable muscle tissue being discharged from the ends in the direction of the dotted arrows (and the hollow arrow in which the assembly is indexed) is minimized due to the obstructed tortuous path that the separated muscle tissue must take if it is to move in that direction. Although a staggered, generally diagonal pattern is shown and preferred for the reasons stated, other pin arrangements, such as rectangular or curvilinear positioning relative to each other, or in which areas are present in which pins have been omitted, e.g. cleared areas, are possible and might be preferred in certain circumstances.

In the preferred embodiment illustrated in FIG. 1, the sinew web S is a byproduct which is not used in preparing the bacon product(s). This web material can be discarded or used in other products. The separated whole muscle tissue MT is the "Lean" of the dark-colored phase. Preferably, this lean dark-colored phase is mixed with water and brine component as generally discussed herein in connection with the light-colored phase. When the heme is extracted from the lean component of the light-colored phase, the water and heme therefrom is added to this dark-colored phase. Thereafter, the dark-colored phase is combined with the light-colored phase to prepare the desired meat product or meat block.

The combined bacon product is a very low-fat bacon product having either a homogeneous appearance or an appearance of light and dark streaks. Typically, the bacon product is extruded. For example, the dark-colored phase and the light-colored phase can be co-extruded into alternating layers of light and dark layers in accordance with meat co-extruding procedures and equipment as practiced and used heretofore in making bacon products made of light and dark turkey components which are currently sold commercially. Alternatively, a homogeneous product of the two lean material phases could be mixed together, and the resulting batter extruded as a loaf. In either event, the combined product(s) can be heat processed and/or subjected to smoking conditions, combined with flavoring agents, chilled and then sliced into strips.

In preparing the light-colored phase, a low-fat source is generated by utilizing fatty loin trimmings having between about 20 weight percent and about 70 weight percent fat, based upon the weight of the trimmings. These pork trimmings are processed through equipment as illustrated in FIGS. 2, 3 and 4. The result is a lean meat supply of loin material which has a fat content of less than 1.5 weight percent fat present in the lean loin material. The dark-colored phase is low-fat lean material having some intact muscle integrity. Muscles are selected from the loin, such as Longissimus dorsi, Gluteus medius and Psoas major. Preferably portions with obvious marbling are excluded. These muscle pieces are membrane-skinned and are subjected through processing in desinewing equipment such as that illustrated in FIG. 5 through FIG. 11. The amount of fat in the desinewed lean muscle tissue is at a level of about 2 weight percent or less, preferably at about 1.5 weight percent or less, and most preferably at about 1 weight percent or less.

It will be appreciated that, under current U.S. Department of Agriculture regulations, only muscles from the belly can be used to make a finished product which can be properly identified as bacon. Accordingly, when pork muscles which do not come from the belly, but come from the loin, are used as noted above, the finished product is more properly identified as a so-called Canadian bacon product.

Other meat sources can be utilized, including other pork sources. In a general sense, the meat sources can include 72 pork, 42 pork, 50 beef, mechanically deboned turkey or other fowl, and other sources of red meat, white meat, fowl or the like. Particularly suitable for desinewing are meat cuts of good quality before processing and meat cuts which are of only marginal quality before processing. The former are further improved by the processing, while the latter are substantially upgraded in quality and value. Examples of meat cuts which are of good quality and in which the quality may be further improved include knuckle muscle such as the Quadriceps femoris muscle, the Rectus femoris muscle and the Vastus lateralis muscle; leg muscles such as Semimembranosus and biceps femoris muscles; and butt muscle such as the Gluteus medius. Examples of other meat cuts which may be of only marginal quality but which may be substantially upgraded include but are not limited to knuckle cap (Tensor fasciae latae); lower and upper shank (Flexur digatorum superficialis/profundus and gastrocnemius); tenderloin (Psoas major, Iliacus and Sartorius); portions of the outside muscle (Semitendinosus, Gluteus superficialis, biceps femoris and Gluteobiceps), and top butt (Gluteus accessorius and Gluteus profundus).

The following examples are presented in order to illustrate the present invention.

EXAMPLE 1

A Canadian bacon product utilizing pork loin raw materials is prepared. A homogeneous product is prepared from two lean materials. One of the lean materials is made utilizing fatty loin trimmings processed through the equipment of FIGS. 2, 3 and 4 in order to separate out the fat and provide loin material having a fat content of less than 1.5%. The other lean material is a low-fat lean material with some intact muscle integrity. This is generated by first selecting muscles from the loin, including Longissimus dorsi, Gluteus medius and Psoas major, excluding portions with obvious marbling. These muscle pieces are membrane-skinned and desinewed on equipment as illustrated in FIGS. 5 through 11.

These two lean muscle materials are added to a mixer. Brine components including water, salt, sodium nitrite, sodium phosphate, sugar, sodium ascorbate and other flavorings are mixed for a time sufficient to achieve a desired protein extraction. Water level is then controlled to USDA regulations. The resulting batter is then extruded as a loaf, heat processed, chilled and then sliced into strips of Canadian bacon product.

EXAMPLE 2

A two-phase bacon product having light and dark streaks is made to provide a product having the appearance of pork belly bacon. A co-extrusion procedure is followed as illustrated in FIG. 1.

Fatty loin trimmings are ground, heated and centrifuged in the presence of a phosphate source as illustrated in FIGS. 2–4. The lean product is mixed with water to extract heme pigments from the lean centrifugate. Same is emulsified with brine components, with reduction to very small particle sizes occurring during emulsification so as to result in a lighter color. Enhanced light color is achieved by higher temperature emulsification, such as above 15° C., but not so high as to denature the meat protein. This results in a significantly lighter color.

The dark-colored phase begins with loin muscles which are membrane-skinned, followed by the desinewing operation as discussed herein. The resulting web material is discarded, while the desinewed lean meat is then mixed with water and the heme extraction from the light-colored phase, together with brine components as desired. Temperatures are maintained well below 15° C. so as to result in a darker color.

The resulting light-colored phase and darkcolored phase are then co-extruded with equipment suitable for forming a bacon belly appearing slab. The resulting slab is processed as is a bacon belly, including curing, heating and smoking, followed by chilling, slicing into strips and packaging within a protective environment.

EXAMPLE 3

Batches of 72 pork are processed through the apparatus as generally illustrated in FIG. 2 through FIG. 4. Sodium tripolyphosphate is added at an upstream location, being added to the pork trimmings prior to entry into the comminution unit. With the sodium tripolyphosphate added at a level of 0.5%, based upon the total weight of the meat, the resulting lean component exiting the centrifuge has an average fat content of about 0.84 weight percent. This is used as the light-colored phase in the FIG. 1 process.

This is combined with a dark-colored phase. Trimmed pork cuts are subjected to connective membrane skinning and processed through desinewing equipment as illustrated herein. The force on the pins is about 3500 pounds, and the force on the compression assembly is about 8000 pounds. The pins are cylindrical and 6.4 mm in diameter, are spaced apart 7.6 mm on centers, and are 650 in number. The compression surface of the compression plate is 25.4 cm by 38 cm. As processed, the product is 70 weight percent lean muscle tissue and 30 weight percent sinew web. Analysis indicates that the processed lean muscle desinewed tissue has 1.9 weight percent fat when the initial meat is pork lower shank, 1.5 weight percent fat when the initial meat product is pork front shank, 1.07 and 0.7 weight percent fat when the initial product is pork upper shank, and 2.5 weight percent fat when the initial meat product is whole turkey thighs.

The resulting co-extruded product, when an all-pork product, after smoking, chilling and slicing has a taste and texture approximating that of natural pork belly bacon when an all-pork product is prepared.

It will be understood that the embodiments of the present invention which have been described are illustrative of the principles of the present invention. Numerous modifications may be made by those skilled in the art without departing from the true spirit and scope of the invention.

We claim:

1. A process for preparing a bacon product, comprising the steps of:
    preparing a first low-fat meat phase from a supply of comminuted meat having a fat content of between about 5% and about 60% by weight, based upon the total weight of the meat, said preparing including:
        heating said supply of meat to a temperature adequate to generally melt fat within the supply of meat without significantly denaturing the meat,
        passing the flow of heated comminuted meat into a centrifuge to subject said flow to a gravitational force sufficient to separate said flow into a lean meat phase and a high fat phase, and
        collecting the lean meat phase, said lean meat phase being said first low-fat meat phase from the centrifuge, said first low-fat meat phase having a fat content of not greater than about 5 percent by weight of fat, based upon the total weight of the first low-fat meat phase;
    forming a second low-fat meat phase from a supply of meat having muscle tissue and sinew, said forming including:
        restraining the sinew against movement relative to a surface,
        imparting a compressive force to the muscle tissue in a direction toward said surface while restraining the sinew, said force being sufficient to separate the muscle tissue from the sinew and cause the muscle tissue to move away from the restrained sinew in a direction at a substantial angle to the direction at which the compressive force is imparted to the muscle tissue, and
        collecting the muscle tissue thus separated, said muscle tissue being said second low-fat meat phase, said second low-fat meat phase having a fat content of not greater than about 5 percent by weight of fat, based upon the total weight of the second low-fat meat phase; and
    combining said first low-fat meat phase and said second low-fat meat phase into a bacon product.

2. The process in accordance with claim 1, wherein said combining step mixes said first low-fat meat phase together with said second low-fat meat phase.

3. The process in accordance with claim 2, wherein said bacon product is a Canadian bacon, both of said preparing and forming steps including providing pork meat.

4. The process in accordance with claim 1, wherein said combining step includes co-extruding said first low-fat meat phase with said second low-fat meat phase to provide said bacon product with different phases which are visibly distinct from each other.

5. The process in accordance with claim 4, wherein said co-extruding step forms a block of meat having an appearance which generally approximates that of a bacon belly, said first low-fat meat phase being a light-colored phase, and said second low-fat meat phase being a dark-colored phase.

6. The process in accordance with claim 5, wherein both of said preparing and forming steps include providing pork meat.

7. The process in accordance with claim 1, further including extracting heme pigments from said first low-fat meat phase to provide a heme extract, and mixing said heme extract with said second low-fat meat phase, said mixing being prior to said combining step.

8. The process in accordance with claim 1, further including emulsifying said first low-fat meat phase, said emulsifying being carried out at a temperature not lower than 15° C.

9. The process in accordance with claim 1, further including adding a phosphate source to said supply of meat for said first low-fat meat phase, said phosphate source being added at a quantity of about 0.5 percent by weight or less of phosphate, based upon the total weight of the meat supply.

10. The process in accordance with claim 9, further including a flowing step between said heating step and said passing step, said flowing step providing a flow of heated comminuted meat having dispersed therewithin phosphate from said phosphate source, and said passing step including passing a flow of the heated meat and phosphate from said flowing step into said centrifuge.

11. The process in accordance with claim 1, wherein each of said steps maintains functionality in the meat such that each of said first low-fat meat phase and said second low-fat meat phase has a functionality of at least about 4, functionality being the ratio of water-holding capacity to protein percentage of the respective meat.

12. The process in accordance with claim 1, wherein the temperature of said heating step is not greater than about 46° C.

13. The process in accordance with claim 1, wherein each of said first and second low-fat meat phases has a fat content of approximately 3.5 weight percent or less, based upon the total weight of the respective low-fat meat phase.

14. The process in accordance with claim 1, wherein each of said first and second low-fat meat phases has a fat content of approximately 2 weight percent or less, based upon the total weight of the respective low-fat meat phase.

15. The process in accordance with claim 1, wherein each of said first and second low-fat meat phases has a fat content of approximately 1 weight percent or less, based upon the total weight of the respective low-fat meat phase.

16. The process in accordance with claim 1, wherein said first low-fat meat phase has a fat content of approximately 1 weight percent or less.

17. The process in accordance with claim 1, wherein said restraining step includes piercing the meat from which the sinew is to be separated.

18. The process in accordance with claim 1, wherein said restraining step includes restraining the sinew by a plurality of elongated pins which are spaced from each other in a direction substantially perpendicular to the longitudinal axes of the pins.

19. The process in accordance with claim 18, wherein during the imparting step the muscle tissue moves through the spaces between the pins and away from the restrained sinew.

20. The process in accordance with claim 1, wherein the meat from which the sinew is to be separated is positioned between a pair of surfaces, and the surfaces are brought together with the meat therebetween to impart the compressive force thereto to separate the muscle tissue from the sinew and cause the muscle tissue to move in a direction substantially parallel to at least one of said surfaces.

21. The process in accordance with claim 20, wherein said sinew is restrained against movement relative to at least one of said surfaces.

22. The process in accordance with claim 1, wherein said imparting step also includes the removal of substantial amounts of fat associated with the sinew that is removed from the meat, said fat being restrained with the sinew with which it is associated while said compressive force is imparted to the muscle tissue to separate the muscle tissue from both the sinew and the fat associated with the sinew.

* * * * *